(12) United States Patent
Daly et al.

(10) Patent No.: US 8,050,511 B2
(45) Date of Patent: Nov. 1, 2011

(54) HIGH DYNAMIC RANGE IMAGES FROM LOW DYNAMIC RANGE IMAGES

(75) Inventors: Scott J. Daly, Kalama, WA (US); Laurence Meylan, Lausanne (CH)

(73) Assignee: Sharp Laboratories of America, Inc., Camas, WA (US)

(*) Notice: Subject to any disclaimer, the term of this patent is extended or adjusted under 35 U.S.C. 154(b) by 843 days.

(21) Appl. No.: 11/233,551

(22) Filed: Sep. 22, 2005

(65) Prior Publication Data
US 2006/0104508 A1    May 18, 2006

Related U.S. Application Data

(60) Provisional application No. 60/628,762, filed on Nov. 16, 2004, provisional application No. 60/628,794, filed on Nov. 16, 2004.

(51) Int. Cl.
G06K 9/40    (2006.01)
(52) U.S. Cl. ......... 382/274; 382/167; 382/254; 382/275
(58) Field of Classification Search .................. 382/167, 382/254, 270, 274, 275
See application file for complete search history.

(56) References Cited

U.S. PATENT DOCUMENTS

| | | |
|---|---|---|
| 3,329,474 A | 7/1967 | Harris et al. |
| 3,375,052 A | 3/1968 | Kosanke et al. |
| 3,428,743 A | 2/1969 | Hanlon |
| 3,439,348 A | 4/1969 | Harris et al. |
| 3,499,700 A | 3/1970 | Harris et al. |
| 3,503,670 A | 3/1970 | Kosanke et al. |
| 3,554,632 A | 1/1971 | Chitayat |
| 3,947,227 A | 3/1976 | Granger et al. |
| 4,012,116 A | 3/1977 | Yerick |
| 4,110,794 A | 8/1978 | Lester et al. |
| 4,170,771 A | 10/1979 | Bly |
| 4,187,519 A * | 2/1980 | Vitols et al. ..................... 348/28 |
| 4,384,336 A * | 5/1983 | Frankle et al. ................ 382/302 |
| 4,385,806 A | 5/1983 | Fergason |
| 4,410,238 A | 10/1983 | Hanson |
| 4,441,791 A | 4/1984 | Hornbeck |

(Continued)

FOREIGN PATENT DOCUMENTS

EP    0 732 669    9/1996

(Continued)

OTHER PUBLICATIONS

Paul E. Debevec and Jitendra Malik. Recovering High Dynamic Range Radiance Maps from Photographs, Proceedings of SIGGRAPH 97, Computer Graphics Proceedings, Annual Conference Series, pp. 369-378 (Aug. 1997, Los Angeles, California). Addison Wesley. Edited by Turner Whitted. ISBN 0-89791-896-7.*

(Continued)

*Primary Examiner* — Jason M Repko
*Assistant Examiner* — Gandhi Thirugnanam
(74) *Attorney, Agent, or Firm* — Chernoff Vilhauer McClung & Stenzel LLP

(57) ABSTRACT

A method for displaying an image includes receiving an image having a first luminance dynamic range and modifying the image to a second luminance dynamic range free from being based upon other images, where the second dynamic range is greater than the first dynamic range. The modified image is displayed on a display.

10 Claims, 13 Drawing Sheets

U.S. PATENT DOCUMENTS

| | | |
|---|---|---|
| 4,516,837 A | 5/1985 | Soref et al. |
| 4,540,243 A | 9/1985 | Fergason |
| 4,562,433 A | 12/1985 | Biferno |
| 4,574,364 A | 3/1986 | Tabata et al. |
| 4,611,889 A | 9/1986 | Buzak |
| 4,648,691 A | 3/1987 | Oguchi et al. |
| 4,649,425 A | 3/1987 | Pund |
| 4,682,270 A | 7/1987 | Whitehead et al. |
| RE32,521 E | 10/1987 | Fergason |
| 4,715,010 A | 12/1987 | Inoue et al. |
| 4,719,507 A | 1/1988 | Bos |
| 4,755,038 A | 7/1988 | Baker |
| 4,758,818 A | 7/1988 | Vatne |
| 4,766,430 A | 8/1988 | Gillette et al. |
| 4,834,500 A | 5/1989 | Hilsum et al. |
| 4,845,761 A * | 7/1989 | Cate et al. .................. 382/101 |
| 4,862,270 A | 8/1989 | Nishio |
| 4,862,496 A | 8/1989 | Kelly et al. |
| 4,885,783 A | 12/1989 | Whitehead et al. |
| 4,888,690 A | 12/1989 | Huber |
| 4,910,413 A | 3/1990 | Tamune |
| 4,917,452 A | 4/1990 | Liebowitz |
| 4,918,534 A | 4/1990 | Lam et al. |
| 4,933,754 A | 6/1990 | Reed et al. |
| 4,954,789 A | 9/1990 | Sampsell |
| 4,958,915 A | 9/1990 | Okada et al. |
| 4,969,717 A | 11/1990 | Mallinson |
| 4,981,838 A | 1/1991 | Whitehead |
| 4,991,924 A | 2/1991 | Shankar et al. |
| 5,012,274 A | 4/1991 | Dolgoff |
| 5,013,140 A | 5/1991 | Healey et al. |
| 5,053,888 A * | 10/1991 | Nomura .................. 358/3.22 |
| 5,074,647 A | 12/1991 | Fergason et al. |
| 5,075,789 A | 12/1991 | Jones et al. |
| 5,083,199 A | 1/1992 | Borner |
| 5,122,791 A | 6/1992 | Gibbons et al. |
| 5,128,782 A | 7/1992 | Wood |
| 5,138,449 A | 8/1992 | Kerpchar |
| 5,144,292 A | 9/1992 | Shiraishi et al. |
| 5,164,829 A | 11/1992 | Wada |
| 5,168,183 A | 12/1992 | Whitehead |
| 5,187,603 A | 2/1993 | Bos |
| 5,202,897 A | 4/1993 | Whitehead |
| 5,206,633 A | 4/1993 | Zalph |
| 5,214,758 A | 5/1993 | Ohba et al. |
| 5,222,209 A | 6/1993 | Murata et al. |
| 5,224,178 A * | 6/1993 | Madden et al. ............... 382/166 |
| 5,247,366 A | 9/1993 | Ginosar et al. |
| 5,256,676 A | 10/1993 | Hider et al. |
| 5,293,258 A * | 3/1994 | Dattilo ...................... 358/518 |
| 5,300,942 A | 4/1994 | Dolgoff |
| 5,305,146 A | 4/1994 | Nakagaki et al. |
| 5,311,217 A | 5/1994 | Guerin et al. |
| 5,313,225 A | 5/1994 | Miyadera |
| 5,313,454 A | 5/1994 | Bustini et al. |
| 5,317,400 A | 5/1994 | Gurley et al. |
| 5,337,068 A | 8/1994 | Stewart et al. |
| 5,339,382 A | 8/1994 | Whitehead |
| 5,357,369 A | 10/1994 | Pilling et al. |
| 5,359,345 A | 10/1994 | Hunter |
| 5,369,266 A | 11/1994 | Nohda et al. |
| 5,369,432 A | 11/1994 | Kennedy |
| 5,386,253 A | 1/1995 | Fielding |
| 5,387,929 A * | 2/1995 | Collier ...................... 348/97 |
| 5,394,195 A | 2/1995 | Herman |
| 5,395,755 A | 3/1995 | Thorpe et al. |
| 5,416,496 A | 5/1995 | Wood |
| 5,418,895 A * | 5/1995 | Lee ........................ 345/604 |
| 5,422,680 A * | 6/1995 | Lagoni et al. ............... 348/674 |
| 5,426,312 A | 6/1995 | Whitehead |
| 5,436,755 A | 7/1995 | Guerin |
| 5,450,498 A | 9/1995 | Whitehead |
| 5,456,255 A | 10/1995 | Abe et al. |
| 5,461,397 A | 10/1995 | Zhang et al. |
| 5,471,225 A | 11/1995 | Parks |
| 5,471,228 A | 11/1995 | Ilcisin et al. |
| 5,477,274 A | 12/1995 | Akiyoshi et al. |
| 5,481,637 A | 1/1996 | Whitehead |
| 5,537,128 A | 7/1996 | Keene et al. |
| 5,563,989 A * | 10/1996 | Billyard ..................... 345/426 |
| 5,570,210 A | 10/1996 | Yoshida et al. |
| 5,579,134 A | 11/1996 | Lengyel |
| 5,580,791 A | 12/1996 | Thorpe et al. |
| 5,592,193 A | 1/1997 | Chen |
| 5,617,112 A | 4/1997 | Yoshida et al. |
| 5,642,015 A | 6/1997 | Whitehead et al. |
| 5,642,128 A | 6/1997 | Inoue |
| 5,650,880 A | 7/1997 | Shuter et al. |
| 5,652,672 A | 7/1997 | Huignard et al. |
| 5,661,839 A | 8/1997 | Whitehead |
| 5,682,075 A | 10/1997 | Bolleman et al. |
| 5,684,354 A | 11/1997 | Gleckman |
| 5,689,283 A | 11/1997 | Shirochi |
| 5,715,347 A | 2/1998 | Whitehead |
| 5,717,421 A | 2/1998 | Katakura et al. |
| 5,717,422 A | 2/1998 | Fergason |
| 5,729,242 A | 3/1998 | Margerum et al. |
| 5,748,164 A | 5/1998 | Handschy et al. |
| 5,751,264 A | 5/1998 | Cavallerano et al. |
| 5,754,159 A | 5/1998 | Wood et al. |
| 5,767,828 A | 6/1998 | McKnight |
| 5,767,837 A | 6/1998 | Hara |
| 5,768,442 A * | 6/1998 | Ahn ......................... 382/274 |
| 5,774,599 A | 6/1998 | Muka et al. |
| 5,784,181 A | 7/1998 | Loiseaux et al. |
| 5,796,382 A | 8/1998 | Beeteson |
| 5,808,697 A * | 9/1998 | Fujimura et al. ............. 348/672 |
| 5,809,169 A | 9/1998 | Rezzouk et al. |
| 5,828,793 A | 10/1998 | Mann |
| 5,854,662 A | 12/1998 | Yuyama et al. |
| 5,886,681 A | 3/1999 | Walsh et al. |
| 5,889,567 A | 3/1999 | Swanson et al. |
| 5,892,325 A | 4/1999 | Gleckman |
| 5,901,266 A | 5/1999 | Whitehead |
| 5,912,651 A | 6/1999 | Bitzakidis et al. |
| 5,939,830 A | 8/1999 | Praiswater |
| 5,940,057 A | 8/1999 | Lien et al. |
| 5,959,777 A | 9/1999 | Whitehead |
| 5,963,665 A * | 10/1999 | Kim et al. .................. 382/169 |
| 5,969,704 A | 10/1999 | Green et al. |
| 5,978,142 A | 11/1999 | Blackham et al. |
| 5,982,926 A * | 11/1999 | Kuo et al. .................. 382/167 |
| 5,986,628 A | 11/1999 | Tuenge et al. |
| 5,991,456 A | 11/1999 | Rahman et al. |
| 5,995,070 A | 11/1999 | Kitada |
| 5,999,307 A | 12/1999 | Whitehead et al. |
| 6,008,929 A | 12/1999 | Akimoto et al. |
| 6,024,462 A | 2/2000 | Whitehead |
| 6,025,583 A | 2/2000 | Whitehead |
| 6,038,576 A * | 3/2000 | Ulichney et al. ............. 708/208 |
| 6,043,591 A | 3/2000 | Gleckman |
| 6,050,704 A | 4/2000 | Park |
| 6,061,091 A * | 5/2000 | Van de Poel et al. ......... 348/241 |
| 6,064,784 A | 5/2000 | Whitehead et al. |
| 6,067,645 A | 5/2000 | Yamamoto et al. |
| 6,079,844 A | 6/2000 | Whitehead et al. |
| 6,111,559 A | 8/2000 | Motomura et al. |
| 6,111,622 A | 8/2000 | Abileah |
| 6,118,820 A * | 9/2000 | Reitmeier et al. ........ 375/240.16 |
| 6,120,588 A | 9/2000 | Jacobsen |
| 6,120,839 A | 9/2000 | Comiskey et al. |
| 6,129,444 A | 10/2000 | Tognoni |
| 6,160,595 A | 12/2000 | Kishimoto |
| 6,172,798 B1 | 1/2001 | Albert et al. |
| 6,211,851 B1 | 4/2001 | Lien et al. |
| 6,215,920 B1 | 4/2001 | Whitehead |
| 6,232,948 B1 | 5/2001 | Tsuchi |
| 6,243,068 B1 | 6/2001 | Evanicky et al. |
| 6,267,850 B1 | 7/2001 | Bailey et al. |
| 6,268,843 B1 | 7/2001 | Arakawa |
| 6,276,801 B1 | 8/2001 | Fielding |
| 6,292,168 B1 * | 9/2001 | Venable et al. .............. 345/605 |
| 6,300,931 B1 | 10/2001 | Someya et al. |
| 6,300,932 B1 | 10/2001 | Albert |
| 6,304,365 B1 | 10/2001 | Whitehead |
| 6,323,455 B1 | 11/2001 | Bailey et al. |
| 6,323,989 B1 | 11/2001 | Jacobsen et al. |

| | | | | | | |
|---|---|---|---|---|---|---|
| 6,327,072 | B1 | 12/2001 | Comiskey et al. | 2002/0044116 A1 | 4/2002 | Tagawa et al. | |
| RE37,594 | E | 3/2002 | Whitehead | 2002/0057238 A1 | 5/2002 | Nitta et al. | |
| 6,359,662 | B1 | 3/2002 | Walker | 2002/0057253 A1 | 5/2002 | Lim et al. | |
| 6,377,383 | B1 | 4/2002 | Whitehead et al. | 2002/0057845 A1* | 5/2002 | Fossum et al. | 382/270 |
| 6,384,979 | B1 | 5/2002 | Whitehead et al. | 2002/0063963 A1 | 5/2002 | Whitehead et al. | |
| 6,400,436 | B1 | 6/2002 | Komatsu | 2002/0067325 A1 | 6/2002 | Choi | |
| 6,414,664 | B1 | 7/2002 | Conover et al. | 2002/0067332 A1 | 6/2002 | Hirakata et al. | |
| 6,418,253 | B2 | 7/2002 | Whitehead | 2002/0070914 A1 | 6/2002 | Bruning et al. | |
| 6,424,369 | B1 | 7/2002 | Adair et al. | 2002/0081022 A1* | 6/2002 | Bhaskar | 382/162 |
| 6,428,189 | B1 | 8/2002 | Hochstein | 2002/0093521 A1 | 7/2002 | Daly et al. | |
| 6,435,654 | B1 | 8/2002 | Wang et al. | 2002/0105709 A1 | 8/2002 | Whitehead et al. | |
| 6,437,921 | B1 | 8/2002 | Whitehead | 2002/0135553 A1 | 9/2002 | Nagai et al. | |
| 6,439,731 | B1 | 8/2002 | Johnson et al. | 2002/0149574 A1 | 10/2002 | Johnson et al. | |
| 6,448,944 | B2 | 9/2002 | Ronzani et al. | 2002/0149575 A1 | 10/2002 | Moon | |
| 6,448,951 | B1 | 9/2002 | Sakaguchi et al. | 2002/0154088 A1 | 10/2002 | Nishimura | |
| 6,448,955 | B1 | 9/2002 | Evanicky et al. | 2002/0159002 A1 | 10/2002 | Chang | |
| 6,452,734 | B1 | 9/2002 | Whitehead et al. | 2002/0159692 A1 | 10/2002 | Whitehead | |
| 6,483,643 | B1 | 11/2002 | Zuchowski | 2002/0162256 A1 | 11/2002 | Wardle et al. | |
| 6,507,327 | B1 | 1/2003 | Atherton et al. | 2002/0171617 A1 | 11/2002 | Fuller | |
| 6,507,372 | B1* | 1/2003 | Kim | 348/630 | 2002/0175907 A1 | 11/2002 | Sekiya et al. | |
| 6,545,677 | B2 | 4/2003 | Brown | 2002/0180733 A1 | 12/2002 | Colmenarez et al. | |
| 6,559,827 | B1 | 5/2003 | Mangerson | 2002/0190940 A1 | 12/2002 | Itoh et al. | |
| 6,573,928 | B1 | 6/2003 | Jones et al. | 2003/0012448 A1* | 1/2003 | Kimmel et al. | 382/274 |
| 6,574,025 | B2 | 6/2003 | Whitehead et al. | 2003/0026494 A1* | 2/2003 | Woodell et al. | 382/260 |
| 6,590,561 | B1 | 7/2003 | Kabel et al. | 2003/0043394 A1 | 3/2003 | Kuwata et al. | |
| 6,597,339 | B1 | 7/2003 | Ogawa | 2003/0048393 A1 | 3/2003 | Sayag | |
| 6,608,614 | B1 | 8/2003 | Johnson | 2003/0053689 A1* | 3/2003 | Watanabe et al. | 382/167 |
| 6,624,828 | B1 | 9/2003 | Dresevic et al. | 2003/0072496 A1 | 4/2003 | Woodell et al. | |
| 6,657,607 | B1 | 12/2003 | Evanickey et al. | 2003/0090455 A1 | 5/2003 | Daly | |
| 6,680,834 | B2 | 1/2004 | Williams | 2003/0107538 A1 | 6/2003 | Asao et al. | |
| 6,690,383 | B1 | 2/2004 | Braudaway et al. | 2003/0108245 A1 | 6/2003 | Gallagher et al. | |
| 6,697,110 | B1 | 2/2004 | Jaspers et al. | 2003/0112391 A1 | 6/2003 | Jang et al. | |
| 6,700,559 | B1 | 3/2004 | Tanaka et al. | 2003/0117654 A1* | 6/2003 | Wredenhagen et al. | 358/3.21 |
| 6,700,628 | B1* | 3/2004 | Kim | 348/687 | 2003/0128337 A1* | 7/2003 | Jaynes et al. | 353/30 |
| 6,707,453 | B1 | 3/2004 | Rossin et al. | 2003/0132905 A1 | 7/2003 | Lee et al. | |
| 6,753,876 | B2 | 6/2004 | Brooksby et al. | 2003/0133035 A1* | 7/2003 | Hatano | 348/362 |
| 6,757,442 | B1* | 6/2004 | Avinash | 382/274 | 2003/0142118 A1 | 7/2003 | Funamoto et al. | |
| 6,788,280 | B2 | 9/2004 | Ham | 2003/0169247 A1 | 9/2003 | Kawabe et al. | |
| 6,791,520 | B2 | 9/2004 | Choi | 2003/0179221 A1 | 9/2003 | Nitta et al. | |
| 6,803,901 | B1 | 10/2004 | Numao | 2003/0197709 A1* | 10/2003 | Shimazaki et al. | 345/590 |
| 6,816,141 | B1 | 11/2004 | Fergason | 2003/0202589 A1* | 10/2003 | Reitmeier et al. | 375/240.12 |
| 6,816,142 | B2 | 11/2004 | Oda et al. | 2003/0235342 A1* | 12/2003 | Gindele | 382/260 |
| 6,816,262 | B1 | 11/2004 | Slocum et al. | 2004/0001184 A1* | 1/2004 | Gibbons et al. | 353/31 |
| 6,828,816 | B2 | 12/2004 | Ham | 2004/0012551 A1 | 1/2004 | Ishii | |
| 6,834,125 | B2 | 12/2004 | Woodell et al. | 2004/0041782 A1 | 3/2004 | Tachibana | |
| 6,836,570 | B2 | 12/2004 | Young et al. | 2004/0051724 A1 | 3/2004 | Elliott et al. | |
| 6,846,098 | B2 | 1/2005 | Bourdelais et al. | 2004/0057017 A1 | 3/2004 | Childers et al. | |
| 6,856,449 | B2 | 2/2005 | Winkler et al. | 2004/0239587 A1 | 12/2004 | Murata et al. | |
| 6,862,012 | B1 | 3/2005 | Funakoshi et al. | 2004/0263450 A1 | 12/2004 | Lee et al. | |
| 6,864,916 | B1* | 3/2005 | Nayar et al. | 348/224.1 | 2005/0047654 A1* | 3/2005 | Newman et al. | 382/167 |
| 6,885,369 | B2 | 4/2005 | Tanahashi et al. | 2005/0073495 A1 | 4/2005 | Harbers et al. | |
| 6,891,672 | B2 | 5/2005 | Whitehead et al. | 2005/0088403 A1 | 4/2005 | Yamazaki | |
| 6,900,796 | B2 | 5/2005 | Yasunishi et al. | 2005/0089239 A1 | 4/2005 | Brajovic | |
| 6,932,477 | B2 | 8/2005 | Stanton | 2005/0117799 A1* | 6/2005 | Fuh et al. | 382/169 |
| 6,954,193 | B1 | 10/2005 | Andrade et al. | 2005/0157298 A1 | 7/2005 | Evanicky et al. | |
| 6,963,665 | B1* | 11/2005 | Imaizumi et al. | 382/181 | 2005/0190164 A1 | 9/2005 | Velthoven et al. | |
| 6,975,369 | B1 | 12/2005 | Burkholder | 2005/0200295 A1 | 9/2005 | Lim et al. | |
| 7,002,546 | B1 | 2/2006 | Stuppi et al. | 2005/0200921 A1* | 9/2005 | Yuan et al. | 358/518 |
| 7,042,522 | B2* | 5/2006 | Kim | 348/671 | 2005/0225561 A1 | 10/2005 | Higgins et al. | |
| 7,110,046 | B2* | 9/2006 | Lin et al. | 348/679 | 2005/0225574 A1 | 10/2005 | Brown et al. | |
| 7,113,163 | B2 | 9/2006 | Nitta et al. | 2005/0254722 A1 | 11/2005 | Fattal et al. | |
| 7,113,164 | B1 | 9/2006 | Kurihara | 2005/0259064 A1 | 11/2005 | Sugino et al. | |
| 7,123,222 | B2 | 10/2006 | Borel et al. | 2006/0013449 A1* | 1/2006 | Marschner et al. | 382/118 |
| 7,127,123 | B2* | 10/2006 | Wredenhagen et al. | 382/274 | 2006/0071936 A1 | 4/2006 | Leyvi et al. | |
| 7,161,577 | B2 | 1/2007 | Hirakata et al. | 2006/0104508 A1 | 5/2006 | Daly et al. | |
| 7,512,269 | B2* | 3/2009 | Golan et al. | 382/168 | 2006/0120598 A1 | 6/2006 | Takahashi et al. | |
| 7,783,127 | B1* | 8/2010 | Wilensky | 382/274 | 2006/0208998 A1 | 9/2006 | Okishiro et al. | |
| 2001/0005192 | A1 | 6/2001 | Walton et al. | 2007/0052636 A1 | 3/2007 | Kalt et al. | |
| 2001/0013854 | A1 | 8/2001 | Ogoro | 2008/0025634 A1* | 1/2008 | Border et al. | 382/274 |
| 2001/0024199 | A1 | 9/2001 | Hughes et al. | 2008/0088560 A1 | 4/2008 | Bae et al. | |
| 2001/0035853 | A1 | 11/2001 | Hoelen et al. | 2010/0104176 A1* | 4/2010 | Hayase | 382/162 |
| 2001/0038736 | A1 | 11/2001 | Whitehead | | | | |
| 2001/0048407 | A1 | 12/2001 | Yasunishi et al. | | | | |
| 2001/0052897 | A1 | 12/2001 | Nakano et al. | | | | |
| 2002/0003520 | A1 | 1/2002 | Aoki | | | | |
| 2002/0003522 | A1 | 1/2002 | Baba et al. | | | | |
| 2002/0008694 | A1 | 1/2002 | Miyachi et al. | | | | |
| 2002/0033783 | A1 | 3/2002 | Koyama | | | | |
| 2002/0036650 | A1 | 3/2002 | Kasahara et al. | | | | |

FOREIGN PATENT DOCUMENTS

| | | |
|---|---|---|
| EP | 0 829 747 | 3/1998 |
| EP | 0 606 162 | 11/1998 |
| EP | 0 912 047 | 4/1999 |
| EP | 0 963 112 | 12/1999 |
| EP | 1 168 243 | 1/2002 |
| EP | 1 202 244 A1 | 5/2002 |

| | | |
|---|---|---|
| EP | 1 206 130 | 5/2002 |
| EP | 1 313 066 | 5/2003 |
| EP | 1 316 919 | 6/2003 |
| EP | 1 453 002 | 9/2004 |
| EP | 1 453 030 | 9/2004 |
| FR | 2 611 389 | 2/1987 |
| GB | 2 388 737 | 11/2003 |
| JP | 64-10299 | 1/1989 |
| JP | 1-98383 | 4/1989 |
| JP | 3-71111 | 3/1991 |
| JP | 3-198026 | 8/1991 |
| JP | 5-66501 | 3/1993 |
| JP | 5-80716 | 4/1993 |
| JP | 5-273523 | 10/1993 |
| JP | 5-289044 | 11/1993 |
| JP | 6-247623 | 9/1994 |
| JP | 6-313018 | 11/1994 |
| JP | 7-121120 | 5/1995 |
| JP | 9-244548 | 9/1997 |
| JP | 10-508120 | 8/1998 |
| JP | 11-52412 | 2/1999 |
| JP | 2002-099250 | 4/2000 |
| JP | 2000-206488 | 7/2000 |
| JP | 2000-275995 | 10/2000 |
| JP | 2000-321571 | 11/2000 |
| JP | 2001-142409 | 5/2001 |
| JP | 2002-91385 | 3/2002 |
| JP | 2003-204450 | 7/2003 |
| JP | 2003-230010 | 8/2003 |
| JP | 3523170 | 2/2004 |
| JP | 2004-294540 | 10/2004 |
| KR | 10-2004-0084777 | 10/2004 |
| TW | 406206 | 9/2000 |
| WO | WO 91/15843 | 10/1991 |
| WO | WO 93/20660 | 10/1993 |
| WO | WO 96/33483 | 10/1996 |
| WO | WO 98/08134 | 2/1998 |
| WO | WO 00/75720 | 12/2000 |
| WO | WO 01/69584 | 9/2001 |
| WO | WO 02/03687 | 1/2002 |
| WO | WO 02/079862 | 10/2002 |
| WO | WO 03/077013 | 9/2003 |
| WO | WO 2004/013835 | 2/2004 |
| WO | WO 2005101309 A1 * | 10/2005 |

OTHER PUBLICATIONS

DiCarlo, J. M. and Wandell, B. (2000), Rendering high dynamic range images, in Proc. IS&T/SPIE Electronic Imaging 2000. Image Sensors, vol. 3965, San Jose, CA, pp. 392-401.*

Kuang, J., Yamaguchi, H., Johnson, G. M. and Fairchild, M. D. (2004), Testing HDR image rendering algorithms (Abstract), in Proc. IS&T/SID Twelfth Color Imaging Conference: Color Science, Systems, and Application, Scottsdale, AR, pp. 315-320.*

Durand, F. and Dorsey, J. (2002), Fast bilateral flltering for the display of high dynamic-range images, in Proc. ACM SIGGRAPH 2002, Annual Conferenceon Computer Graphics, San Antonio, CA, pp. 257-266.*

Kang, S. B., Uyttendaele, M., Winder, S. And Szeliski, R. (2003), High dynamic range video, ACM Transactions on Graphics 22(3), 319-325.*

Meylan, Laurence ; Daly, Scott ; Süsstrunk, Sabine, "The Reproduction of Specular Highlights on High Dynamic Range . Displays", 2006, IS&T/SID 14th Color Imaging Conference (CIC), p. 1-6.*

Meylan, Laurence , "Tone mapping for high dynamic range images",2006, "http://library.epfl.ch/theses/?nr=3588", Institut ISC Institut de systèmes de communication, p. 87-124.*

Farid, Hany and Adelson, Edward, "Separating Reflections and Lighting Using Independent Components Analysis", In Proceedings of IEEE Computer Society Conference on Computer Vision and Pattern Recognition, 1:262-267, 1999.*

G.Ward, High Dynamic Range Imaging, Proc. IS&T/SID 9th Color Imaging Conference, 9-16, 2001.*

Nayar, Shree et al., "Separation of Reflection Components Using Color and Polarization", International Journal of Computer Vision 21(3), 163-186, 1997.*

Larson, Gregory W., "Overcoming Gamut and Dynamic Range Limitations in Digital Images", Color Imaging Conference, Scottsdale, Arizona, 1998.*

Youngshin Kwak and Lindsay W. Macdonald, "Accurate Prediction of Colours on Liquid Crystal Displays," Colour & Imaging Institute, University of Derby, Derby, United Kingdom, IS&T/SID Ninth Color Imaging Conference, pp. 355-359, Date Unknown.

A.A.S. Sluyterman and E.P. Boonekamp, "18.2: Architectural Choices in a Scanning Backlight for Large LCD TVs," Phillips Lighting, Bld. HBX-p,PO Box 80020, 5600 JM Eindhoven, The Netherlands SID 05 Digest, p. 996-999.

Steven L. Wright, et al., "Measurement and Digital compensation of Crosstalk and Photoleakage in High-Resolution TFTLCDs," IBM T.J. Watson Research Center, PO Box 218 MS 10-212, Yorktown Heights, NY 10598, pp. 1-12, date unknown.

Fumiaki Yamada and Yoichi Taira, "An LED backlight for color LCD," Proc. SID, International Display Workshop (IDW'00) Nov., 2000, pp. 363-366.

Fumiaki Yamada, Hajime Nakamura, Yoshitami Sakaguchi and Yoichi Taira, "52.2: Invited Paper: Color Sequential LCD Based on OCB with an LED Backlight"; SID'00 Digest, 2000, pp. 1180-1183.

N. Cheung et al., "Configurable entropy coding scheme for H.26L," ITU Telecommunications Standardization Sector Study Group 16, Elbsee, Germany, Jan. 2001,11 pages.

T. Funamoto, T. Kobayashi, T. Murao, "High-Picture-Quality Technique for LCD televisions: LCD-AI," Proc. SID, International display Workshop (IDW'00), Nov. 2000, pp. 1157-1158.

Paul E. Debevec and Jitendra Malik, "Recovering High Dynamic Range Radiance Maps from Photographs," Proceedings of SIGGRAPH 97, Computer Graphics Proceedings, Annual Conference Series, pp. 369-378 (Aug. 1997, Los Angeles, California). Addison Wesley, Edited by Turner Whitted. ISBN 0-89791-896-7.

DiCarlo, J.M. and Wandell, B. (2000), "Rendering high dynamic range images," in Proc. IS&T/SPIE Electronic Imaging 2000. Image Sensors, vol. 3965, San Jose, CA, pp. 392-401.

Kuang, J., Yamaguchi, H., Johnson, G.M. And Fairchild, M.D. (2004), "Testing HDR image rendering algorithms (Abstract)," in Proc. IS&T/SID Twelfth Color Imaging Conference: Color Science, Systems and Application, Scottsdale, AR, pp. 315-320.

Durand, F. and Dorsey, J. (2002), "Fast bilateral filtering for the display of high dynamic-range images," in Proc. ACM SIGGRAPH 2002, Annual Conference on Computer Graphics, San Antonia, CA, pp. 257-266.

Kang, S.B., Uyttendaele, M., Winder, S. And Szeliski, R. (2003), "High Dynamic Range Video," ACM Transactions on Graphics 22(3), 319-325.

Brian A. Wandell and Louis D. Silverstein, "The Science of Color," 2003, Elsevier Ltd, Ch. 8 Digital Color Reproduction, pp. 281-316.

* cited by examiner

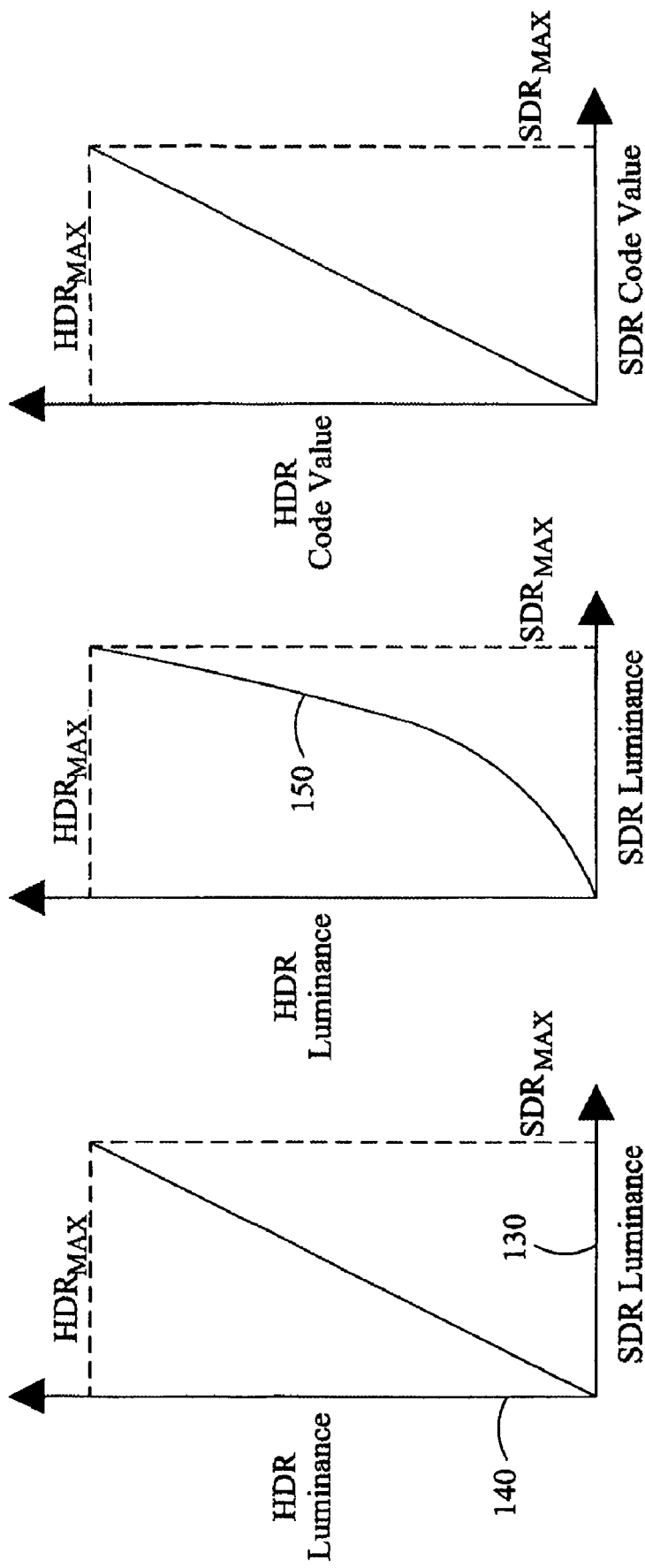

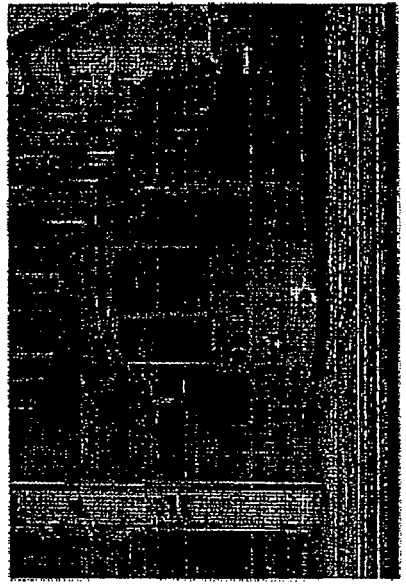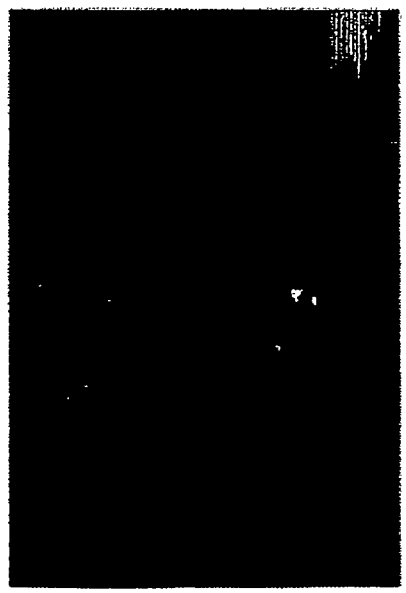
FIG. 15

Input code value (mdw = breakpoint)

MDW

HIGH DYNAMIC RANGE IMAGES FROM LOW DYNAMIC RANGE IMAGES

CROSS-REFERENCE TO RELATED APPLICATIONS

This application claims the benefit of U.S. Ser. No. 60/628,762 filed Nov. 16, 2004 entitled Using Spatial Assessment to Increase the Dynamic Range of Imagery and claims the benefit of U.S. Ser. No. 60/628,794 filed Nov. 16, 2004 entitled Generating High Dynamic Range Image Data From Low Dynamic Range Image Data by the use of Spatial Operators.

BACKGROUND OF THE INVENTION

The present application relates to increasing the dynamic range of images.

Many scenes existing in the real world inherently have extremely high dynamic range. For example, white paper in full sunlight has a luminance level of 30,000 cd/m^2, while white paper in the full moon has a luminance level of 0.01 cd/m^2, giving a dynamic range of 3 million to one (or 6.4 log units). The human eye can see even dimmer levels than 0.01 cd/m^2, so the visible range is even greater. In most situations, the dynamic range of a single scene is usually not this great, but it is frequently in excess of 5 log units. The human eye can only see 2-3 log units at a given instant, but is able to adjust the range via light adaptation, which can be less than a few seconds for the smaller adjustments, such as being able to go from reading a magazine in the sun to looking into the shadow under a car. More extreme range changes, such as going into a movie theatre from daylight, can take more than a minute.

Since traditional displays (both soft copy and hard copy) are not capable of displaying the full range luminances of the real world, a luminance mapping transfer is used to map from the dynamic range of the real world to the lower dynamic range of the display. Generally this mapping is performed in the image capture stage, and examples include the shoulder of D-Log-E curve for film, saturation for CCD sensors, or clipping in the A/D stages of such capture processes. These mapping functions are generally point processes, that is, ID functions of luminance that are applied per pixel (in the digital versions).

Computer graphics can generate images in floating point that match the luminances of the real world (generally, radiance approaches). In addition, some digital cameras similarly capture images with 12 to 16 bits per color. These are usually represented in a 16-bit format (examples: Radiance XYZ, OpenEXR, scRGB). But these digital images cannot be traditionally displayed without conversion to the lower dynamic range of the display. Generally the mapping algorithms for conversion from a greater to a lower dynamic range for the display capabilities are referred to as Tone Mapping Operators (TMO).

Tone Mapping Operators can be point processes, as mentioned for film and digital capture, but they can include spatial processes as well. Regardless of the type of TMO, all the approaches have traditionally been designed to go from a high dynamic range (HDR) image to a lower dynamic range (LDR) display (this term encompasses standard dynamic range, SDR).

BRIEF DESCRIPTION OF THE SEVERAL VIEWS OF THE DRAWINGS

FIG. 2 illustrates a standard dynamic range luminance versus high dynamic range luminance.

FIG. 3 illustrates a gamma adjusted standard dynamic range luminance versus high dynamic range luminance.

FIG. 4 illustrates standard dynamic range code value verses high dynamic range code values.

FIG. 15 illustrates linearly scaled low dynamic range image (top left), specular highlight candidate 1 (top right), specular highlight candidate 2 (bottom left), and image rescaled with piecewise linear technique (bottom right).

DETAILED DESCRIPTION OF THE PREFERRED EMBODIMENT

Figure 1:
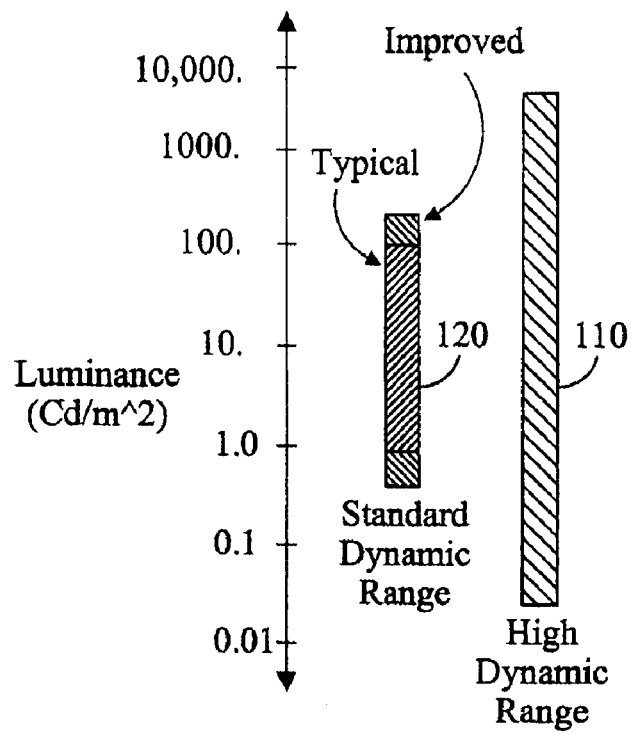
FIG. 1 illustrates a comparison of dynamic images for standard and high dynamic range displays.

Newly developed displays have been made which have substantially higher dynamic range than the traditional state of the art displays. The general difference in dynamic ranges for the newly developed displays 110 and the traditional displays 120 is shown in FIG. 1 for a log luminance scale. Some current state of the art standard dynamic range displays may have a range of 500 cd/m^2 to 0.7 cd/m^2. The newly developed "high dynamic range" displays may have a range from 3000 cd/m^2 to 0.05 cd/m^2, or even lower. In existing display technologies the image data is displayed on the display with its existing dynamic range.

The present inventors came to the realization that the image being presented on the display could be subjectively improved if the dynamic range of the image data is effectively increased. Since most images are already represented in a LDR (low dynamic range) format, a technique is desirable to convert the image from LDR up to HDR (high dynamic range).

One technique suitable to perform a mapping from a lower dynamic range image to a higher dynamic range image suitable for display on a higher dynamic range 130 display is shown in FIG. 2. The technique includes a linear stretch from the lower dynamic range shown on the horizontal axis, to the higher dynamic range 140, shown on the vertical axis. The horizontal axis is shown as shorter than the vertical axis to convey the smaller range. On the left, the axes are in terms of actual luminances.

The technique illustrated in FIG. 2 tends to result in a somewhat 'flat' contrast in the modified image. To improve the contrast, referring to FIG. 3, a nonlinear mapping 150 using a gamma function, or another suitable function, is used to increase the contrast. The axes are shown in units of luminance.

The technique illustrated in FIG. 4 shows a linear stretch where the axes are in code values. Since the code values are generally nonlinear in luminance, this is equivalent to a nonlinear mapping, such as is shown in FIG. 3. In the illustrations shown in FIGS. 2, 3, and 4, the TMOs may be non-adaptive "point processing" approaches. They do not use spatial processes, nor do they change depending on the contents of the image. It is to be understood that the processes may be spatial processes and change depending on the content of the image, if desired.

For HDR displays that have high dynamic range at the pixel resolution, the linear stretch technique increases the amplitude gray level resolution (i.e., more actual bits, rather than just adding 0s or 1s to the LSBs, which typically occurs in the linear scaling approach). For other HDR displays, such as multiband versions, where two modulating layers are used that have differing resolution, the increase in actual bits is not necessary, if desired.

Figure 5:
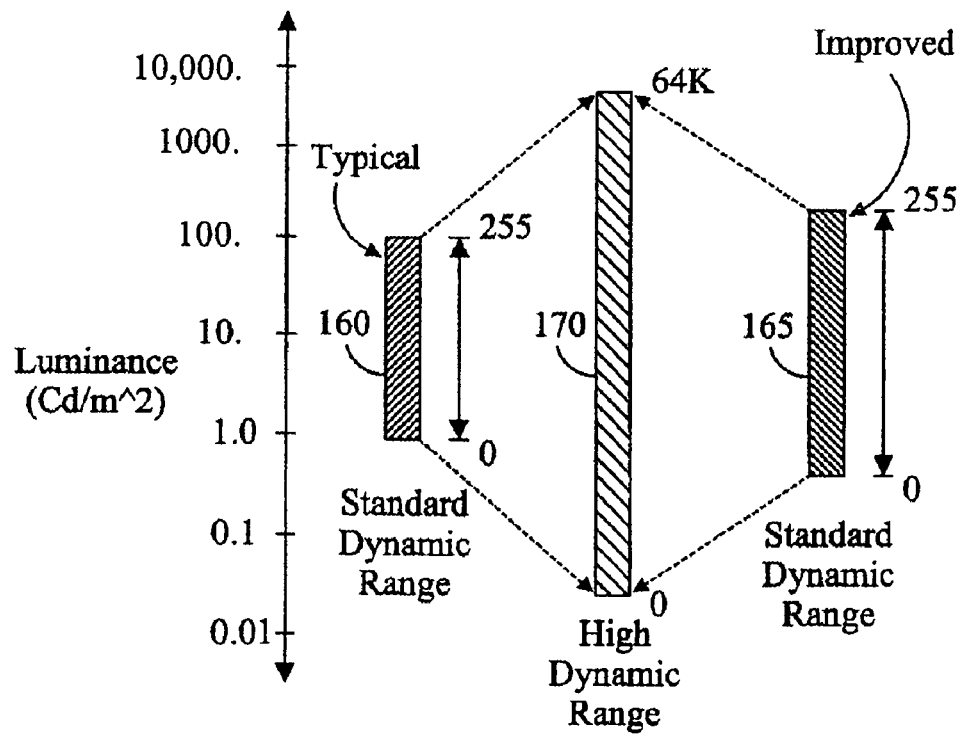
FIG. 5 illustrates a mapping of dynamic images for standard and high dynamic range displays.

In many cases, the black point and the white point for different image sources are different. In addition, the black point and the white point for different displays are different. It is desirable to adjust the mapping for a lower dynamic range 160, 165 to a higher dynamic range 170 (e.g., luminance and/or digital values) to account for the different image sources and/or the different displays. Referring to FIG. 5, an illustration shows a grey level range for an exemplary high dynamic range 170, as well as the endpoints (light end and dark end) mappings that may be used, as expressed in luminances, for different types of standard 160, 165 (i.e. lower) dynamic ranges. Further, these SDR ranges may result from the storage format of the input digital image (e.g., 8 bits/color sRGB format), or from the image capture process (film has around 5-10 stops or a 1.7-3 log unit range, radiographs can be as high as 4 log units). However, for display purposes they are usually digitized and represented with less than 2 log units of range.

Figure 6:
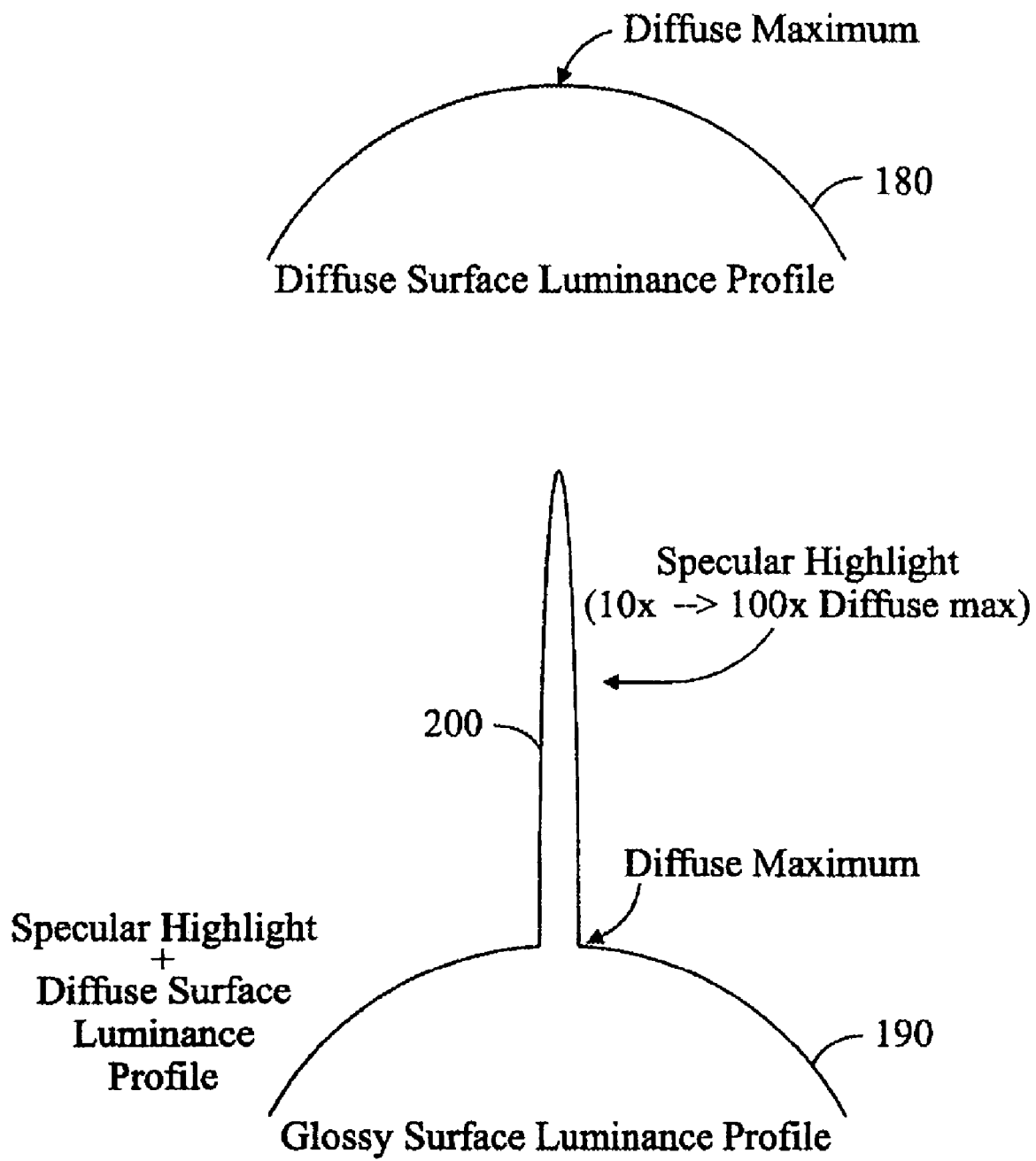
FIG. 6 illustrates luminance profiles of diffuse and glossy curved surfaces.

The preferred embodiment may use the properties of the physical specular highlights, as well as the typical ways in which the specular highlight is modified by the image capture (or representation format), to re-create the physical specular highlight properties on the display. FIG. 6 shows an exemplary luminance profile 180 of a diffuse surface. The physical surface may be curved or flat, as both may lead to this general shape. A flat surface will lead to this general shape if it is Lambertian (a type of diffuse) and the light source is not at infinity. A curved surface will likewise lead to this type of general profile even if the light source is at infinity. FIG. 6 also shows an exemplary physical luminance profile 190 if the surface is glossy. The narrow region with high luminance 200 is referred to as the specular highlight, and it primarily has the color of the light source, as opposed to the color of the diffuse object. In many cases there is some mixing of the object color and the light source color.

The amplitude of the specular highlight is very high in the physical world. It can be as high as 100 times the luminance of the diffuse reflected luminance. This can occur even if the diffuse object is white. This large amplitude specular highlight is not captured in the low dynamic range image. If it was, then since the LDR image range is usually less than 2.5 log units and since the specular range can be as high as 2 log units, most of the image will be concentrated in the lower 0.5 log units, and will be nearly black. So in a LDR image, the specular highlight is reduced in amplitude in several ways.

Figure 7:
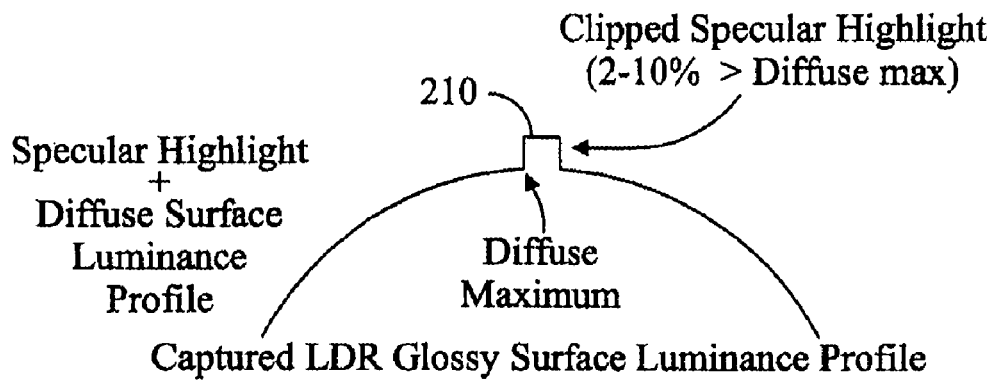
FIG. 7 illustrates low dynamic range glossy surface luminance profile.

One of the ways the specular highlight is reduced is by clipping. Values out of range are simply set to the maximum value 210, as shown in FIG. 7. This occurs in a good exposure, where care was taken not to set the image maximum to the diffuse maximum. That is, some shape of the specular highlight will be visible in the image (generally correct in position and shape), but the specular highlight won't be as bright relative to the object as it is in the physical world. The consequence is that the image looks less dazzling, and less realistic.

Figure 8:
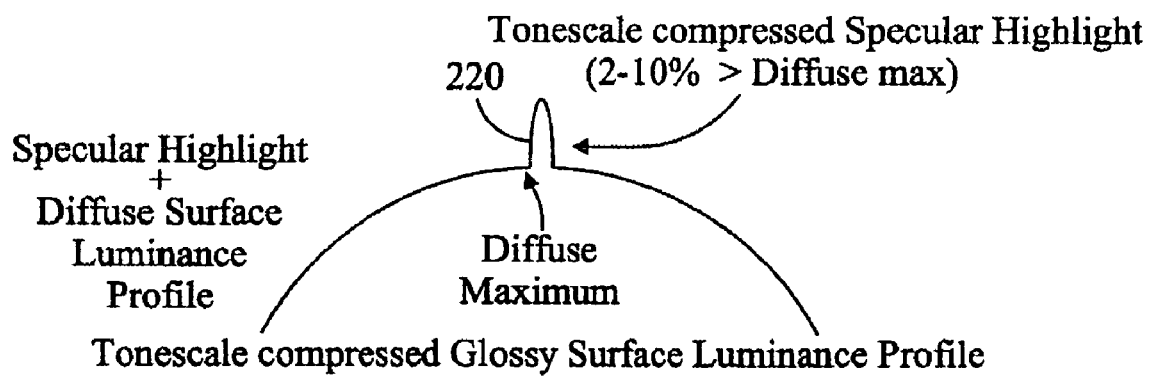
FIG. 8 illustrates low dynamic range image of glossy surface luminance profile using tone scale highlight compression.

Referring to FIG. 8, another way the specular highlight can be reduced is via tonescale compression. An example is that resulting from the s-shaped tone response curve of film. Here the position, spatial shape, and even relative luminance profile of the specular highlight 220 is preserved, but the actual amplitude is reduced (as in the clipped case).

As illustrated, the preferred technique includes a linear scaling of the LDR image to the HDR image. The scaling may likewise include a decontouring technique to generate additional bit depth. Other techniques may likewise be used to generate additional bit depth. In addition non-linear scaling may be used.

Figure 9:
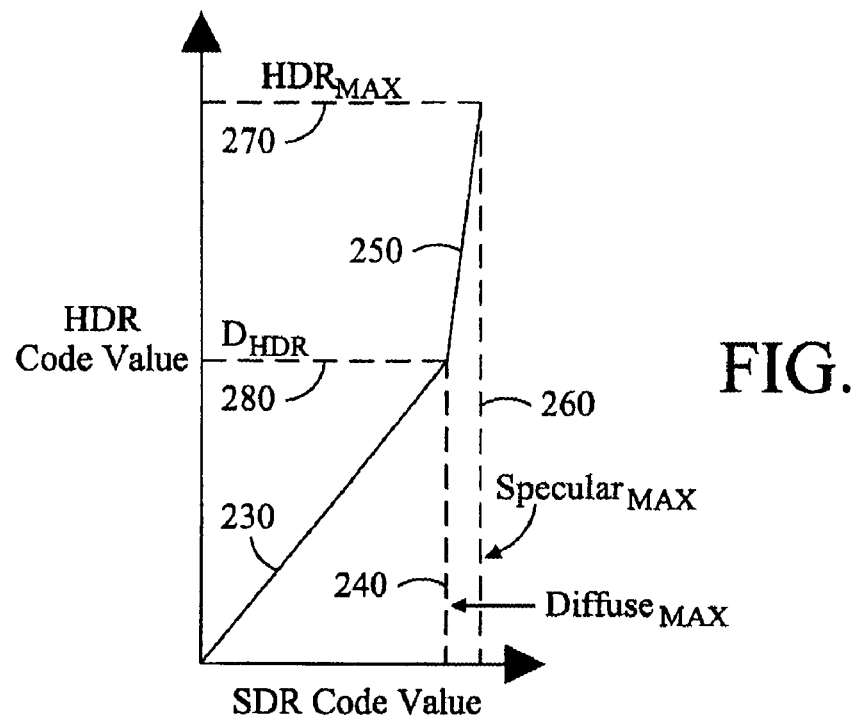
FIG. 9 illustrates standard dynamic range code values verses high dynamic range code values with a modified mapping.

The characterization of the specular highlight, as previously discussed, may be used at least in part to expand the tone scale of the image. Referring to FIG. 9, the image region 230 where the luminance falls below the diffuse maximum 240 is tone mapped with a lower slope than the image regions 250 that have captured the specular highlight. The specular highlight maximum value 260, as found in the image, Specular$_{max}$, as well as the diffuse region maximum value 240, Diffuse$_{max}$, appear on the horizontal axes. This axis corresponds to the input image digital code values. It is to be understood that these values may likewise be approximate. In general, the range from zero to Diffuse$_{max}$ (or another appropriate value) has a greater amount of the code value range or otherwise a greater range of luminance than the range from Diffuse$_{max}$ to Specular$_{max}$. As a general matter, the lower range of luminance values of the input image are mapped with a first function to the luminance values of the high dynamic range image, and the upper range of luminance values of the input image are mapped with a second function to the luminance values of the high dynamic range image, where the first function results in a denser mapping than the second function. One way to characterize the denser mapping is that the first function maps the diffuse to lower values with a lower tonescale slope than the specular image for the second function.

The two gray levels extracted from the LDR input image are mapped to the HDR display to its luminances, as shown. The Specular$_{max}$ is mapped to the HDR displays' maximum value 270, while the Diffuse$_{max}$ is mapped to a value referred to as D$_{HDR}$ 280, referring to the diffuse max point as displayed on the HDR display. One can see a certain amount of the dynamic range of the HDR display is allocated for the diffusely reflecting regions, and a certain amount is allocated to the specular. The parameter $D_{HDR}$ determines this allocation. Allocating more to the specular highlight makes the highlights more dazzling, but results in a darker overall image. The decision is affected by the actual range of the HDR display. For very bright and high ranging HDR displays, more of the range can be allocated to the specular region without having the image appear dark.

Figure 10:
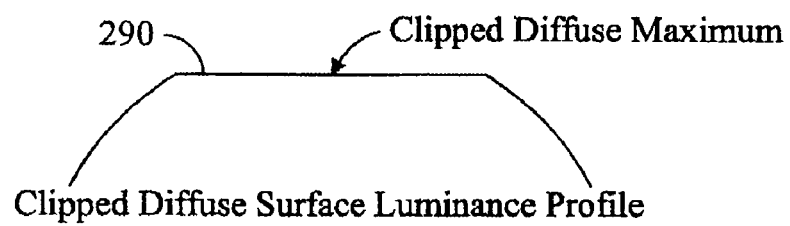
FIG. 10 illustrates low dynamic range image where diffuse maximum is clipped.

In some images with a poor exposure, even the diffuse maximum value 290 is clipped, as shown in FIG. 10. In these cases there is a complete loss of any specular highlight info. That is, the position, the shape, and the luminance profile of the highlight is substantially missing. In those cases the system may selectively determine that there is no need to attempt to restore the highlight.

In order to most effectively use the tonescale of FIG. 9, the systems determines the Specular$_{max}$ and Diffuse$_{max}$ values from the image. This may be done by first finding the maximum of the image, and assume it is the specular maximum. This is generally not the case if there is a large amount of noise or if the image contains no specular highlights.

Figure 11:
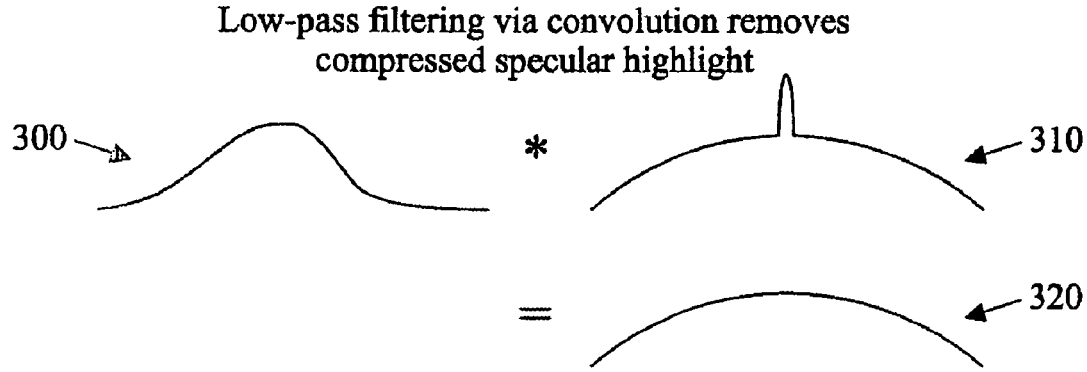
FIG. 11 illustrates low pass filtering to estimate specular highlight.

The system also determines the diffuse maximum from the image. The technique involves removal or otherwise attenuate the specular highlight. In general the specular highlight has anticipated characteristics, such as it may be a small isolated region, it may be relatively narrow with high amplitude in the physical scene, but in the LDR image, it tends to be narrow with small amplitude. The system may use a low-pass filter 300 to reduce the specular highlight 310, as shown in FIG. 11. For example, the low pass filter may be large enough so that the result is too blurry 320 to be used for actual viewing. That is, the LPF step is used to identify the diffuse maximum of the diffuse image.

For the case where even the diffuse maximum has been clipped (see FIG. 10), then the image maximum and the LPF image maximum will be substantially the same. This is also true in cases where there is no significant specular highlight. The maximum found is then assumed to be the diffuse maximum. In both cases, then the tone mapper does not place any image regions in the region with increased slope for specular highlights. It can then use the tone mapper from FIG. 9 (where the found image max is set as the diffuse max) or the general linear stretch from FIG. 4 where the found image max sets the image max.

Figure 12:
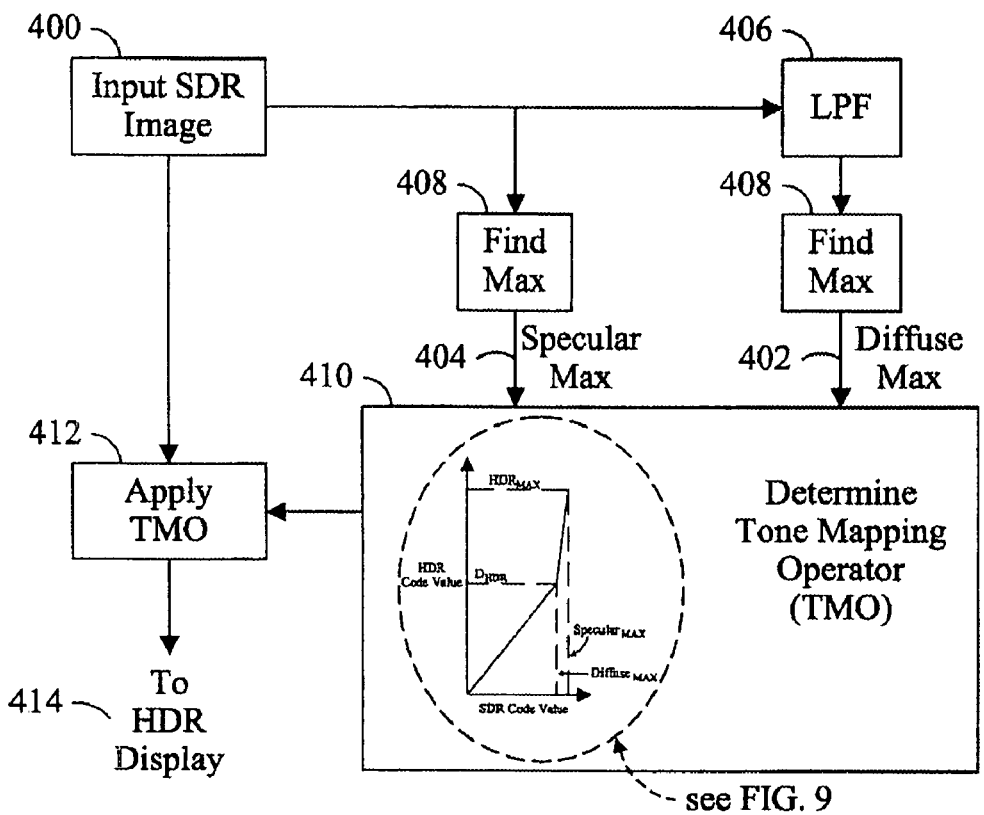
FIG. 12 illustrates a global technique for low dynamic range to high dynamic range mapping.

FIG. 12 illustrates another technique for performing this image modification. The input SDR image 400 is used estimate the diffuse max 402 and specular max 404 using low pass filtering 406 and maximum operators 408. These parameters are input to a process 410 for determining a tone mapping operator (TMO). The TMO from process 410 is applied to the input image 400 to provide an image for the HDR display 414.

In many cases existing high dynamic range data formats are in the linear space and high dynamic range displays are designed to operate in the linear space. In contrast, many low dynamic range data formats are represented in the gamma domain (e.g., sRGB). While either the linear space (substantially linear) or the gamma space (substantially non-linear) may be used for image processing, it is preferable to use the linear space because the understanding of the physics of specular highlights is more understood in the linear space. If the input image is not in the preferred format, such as linear domain or gamma domain, then the input image may be converted to the preferred domain.

While the system functions well, it turns out that the techniques sometimes do not detect some of the specular highlights. After further examination it was determined that some specular highlights are difficult to detect because the specular highlights are not always saturated (e.g., clipped), the specular highlights can be in 1, 2, and/or 3 of the color channels (e.g., in the case of three color channels), the size of the specular highlights is usually small in a scene and varies on how the picture was obtained, and that the specular highlights are often of a regular shape but not always circular in nature primarily due to the projection of the image on the image plane.

It has been determined that since the specular highlights are not always saturated, a fixed threshold may have a tendency to miss specular highlights. Based upon this observation, the system preferably uses an adaptive threshold. The preferred technique computes a low-pass filtered image and assumes that it corresponds to the diffuse image.

Initially the specular image specI is defined as follows:

$$T1=\max(\text{lowpass}(I))$$

$$\text{spec}I=I>T1$$

Figure 13:
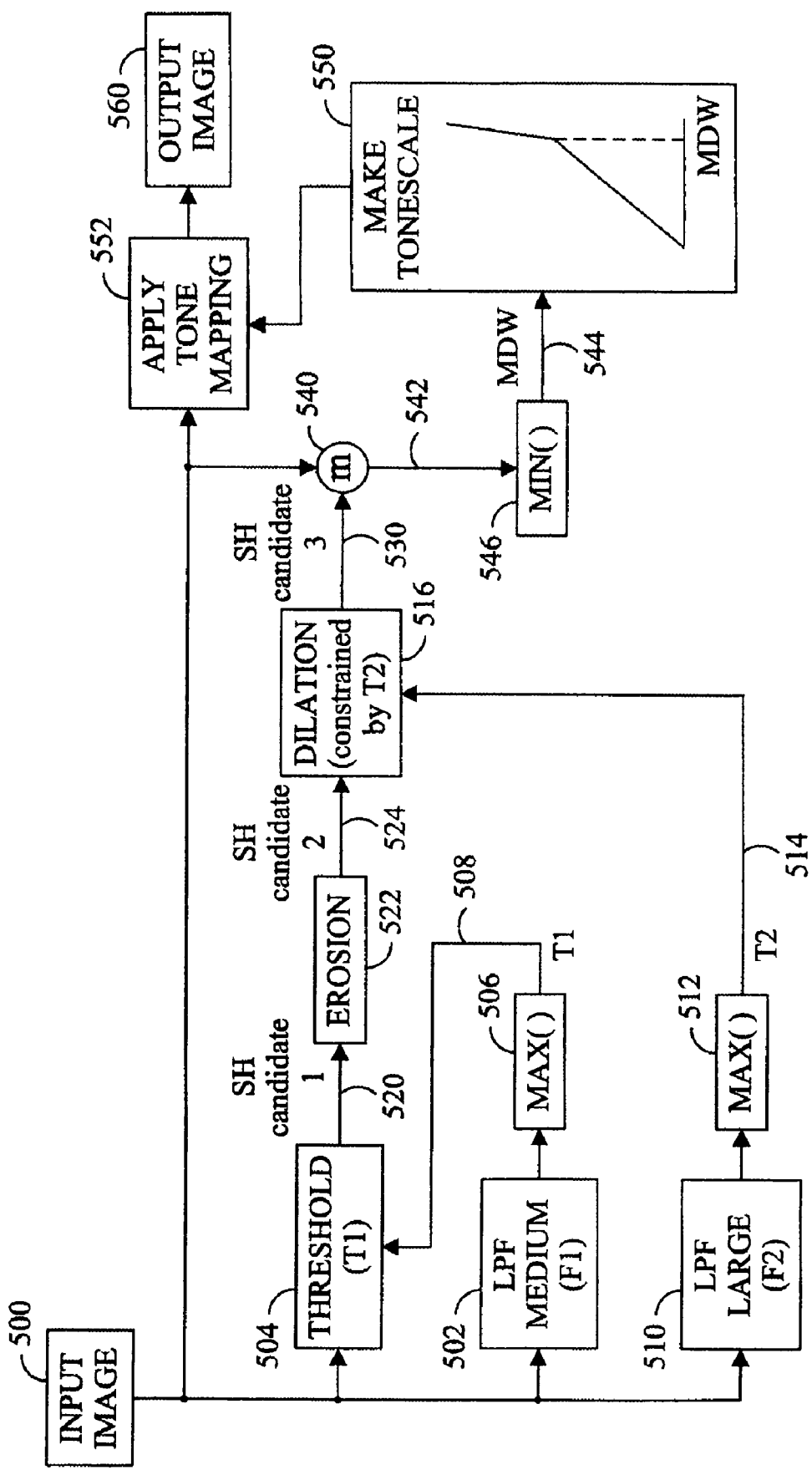
FIG. 13 illustrates another local technique for low dynamic range to high dynamic range mapping.

The size of the low-pass filter is preferably based on the assumption that specular highlights are small and bright. An example includes 11 taps for an image of size 1024 vertical (e.g., XGA), and is scaled accordingly for different image sizes. Additional morphological operations may then be used in order to include the pixels that were rejected by the threshold but are likely to be part of the specular highlights. An exemplary technique is shown in FIG. 13.

Specular highlights tend to be very bright and they can be as bright as 2 log units or more over the diffuse maximum value. Even allocating 1 log unit to the specular highlights mean that about $1/10^{th}$ of the dynamic range should be allocated to diffuse image while $9/10^{th}$ should be allocated to specular highlights. That is not generally feasible, with the exception of very bright HDR displays. Accordingly, achieving the actual max possible dynamic range of 2 logs for specular highlights may not be desirable in many cases.

Based upon an understanding that the range allocated to the specular highlights will be less than that of the physical world, a study was conducted to estimate what range should be allocated to specular highlights using images that were segmented by hand so that an assumption could be made based upon ideal specular highlight detection. With these isolated specular highlights, two primary different methods for scaling were investigated, namely, ratio scaling and piecewise linear scaling.

With respect to ratio scaling, the motivation for this technique is that in some cases, not all three color channels have clipped specular highlights (i.e., image's specular highlights are a mixture of FIGS. 7 and 8 across the color bands). Since the specular highlight generally reflects the color of the light source, this situation occurs with non-white light sources. The principle is to look for the ratio or other relationship between color channels in the region just outside where clipping has occurred, and deduce the value of the clipped channels by generally maintaining the RGB ratios relative to the unclipped channel. However, in the case that all three color channels are saturated (clipped) this technique not especially suitable. Moreover, it has been determined that the ratio can differ drastically from one pixel to the other along the specular highlight contour. Further, even if one of the specular highlights is not clipped, there is a good chance it is has been compressed via an s-shaped tonescale (see FIG. 8).

With respect to piecewise linear scaling, this technique scales the image with a two slope function whose slopes are determined by the maximum diffuse white. The function parameters are the maximum diffuse white, specular highlight max (usually the image max) and the range allocated to the specular highlights. It is possible to use a fixed slope and/or a fixed range. However, to reduce visible artifacts between diffuse and specular parts of an image, it is preferable to use an adaptive function that changes the allocated range from ¾ to ⅓ depending on the maximum diffuse white.

Referring to FIG. 13, the image 500 processing include the following:
1) Low pass filter with filter F1 502;
   a. detemiine maximum 506 of the low passed image 502;
   b. use maximum 506 to determine threshold T1 508;
   c. use the threshold T1 508 to modify the image 500 with a threshold operation 504;
   The process preferably uses a low-pass filter that is about $\frac{1}{100}^{th}$ of the image dimension (11 pixels for a 1024 image) based upon the luminance.
2) Low pass filter with lowpass filter F2 510, (F2>F1, spatially)
   a. determine maximum 512 of the low pass image 510;
   b. use maximum 512 to determine threshold T2 514;
   c. use the threshold T2 514 to modify the image 500 with a dilation operation 516;
   The process preferably uses a low-pass filter that is about $\frac{1}{50}^{th}$ of the image dimension (21 pixels for a 1024 image) based upon the luminance.
3) The threshold operation 504 of the image 500 with T1 514 determines the $1^{st}$ specular highlights candidates 520, which may be in the form of a binary map, if desired.
4) Refine binary map 520 with an erosion morphological operator 522 to provide SH candidate 2 524.
   a. the erosion 522 removes single pixels (parameter set as such) and also reduces false SH candidates 520 due to noise that was clipped.
5) Refine binary map 524 with the dilation morphological operator 516 to provide SH candidate 3 530;
   a. the dilation 516 is constrained by T2 514;
   b. If pixel>T2 and 4 neighbors are specular highlight candidates->pixel=SH candidate
   c. threshold T2 514 serves as a constraint to limit the expansion.
6) Mask 540 the input image 500 with the specular highlight map 530;
   a. i.e. if pixel not SH, then ignore by masking out the pixel value to provide a masked image 542.
7) Find maximum diffuse white (MDW) 544 by taking the minimum 546 of the masked image 542;
   a. this provides the minimum of image in specular highlight region;
   b. due to the constrained morphological operator, it is likely that the maximum of the diffuse image be larger than the minimum specular images. This reduces the bright areas of the diffuse image to be boosted up as well.
8) Generate tonescale (tone mapping operator, TMO) 550 using MDW 544 and range desired for specular highlight;
   a. an adaptive slope technique is preferred.
9) Process the input image 500 based upon the TMO 550 by applying the tone mapping 552;
   a. one approach is to run entire image through the single TMO;
   b. other approach is to use different TMOs for each class of pixel (specular highlight and non-SH) using the binary map.
10) Output image 560 is sent to the HDR display.

This technique may presume that the specular highlights are small and bright for improved effectiveness. That means that large bright light source such as sun will not likely be detected by this technique.

Figure 14:
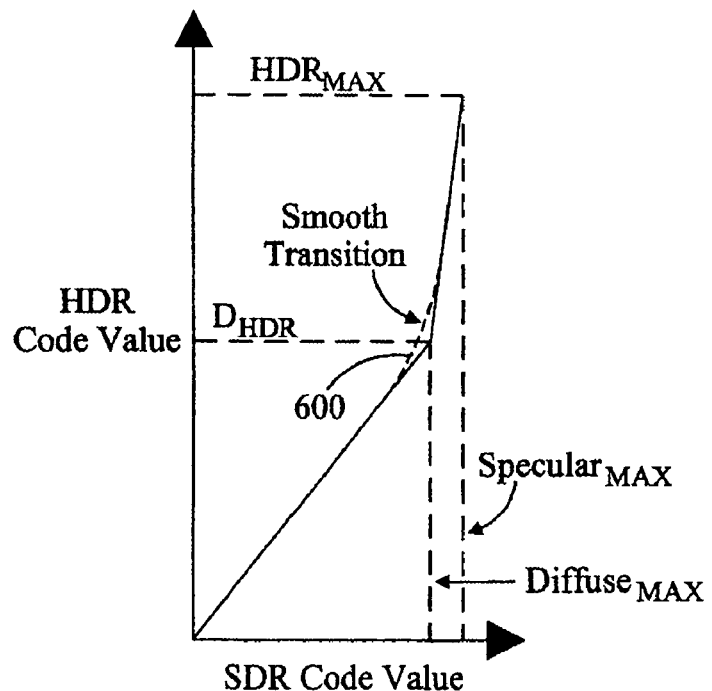
FIG. 14 illustrates a mapping of standard dynamic range code values to high dynamic range code values.

In FIG. 9, the tone-mapping operator has a sharp transition between the two regions. In practice it is better to have a smooth transition 600 between the two regions, such as illustrated in FIG. 14.

In FIG. 15, results are shown comparing the technique of FIG. 13 to linear scaling. The results are best viewed on a HDR display. Nevertheless, one can observe the difference in the images and how the specular highlights are much brighter than their underlying diffuse regions.

Parameters may be set to determine what dynamic range should be allocated to the specular highlights. Because the specular highlights are often very bright (2 log units) and the detection part determines the maximum diffuse white (MDW) making it image dependent, the scaling function may include an additional slope based parameter (fixed slope/ fixed range). As a result the system may include an adaptive slope technique.

Figure 16A:
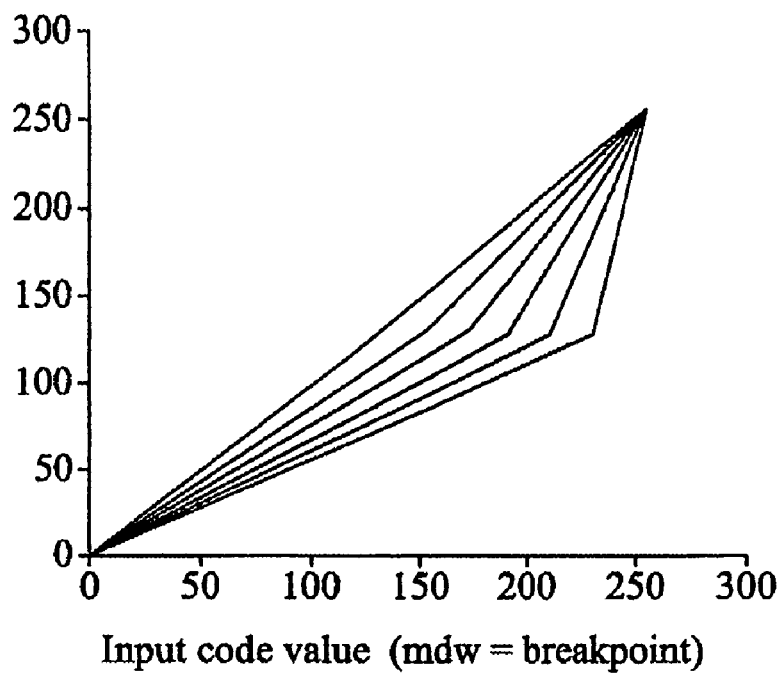
FIG. 16A illustrates a fixed range allocated to specular highlight region.
Figure 16B:
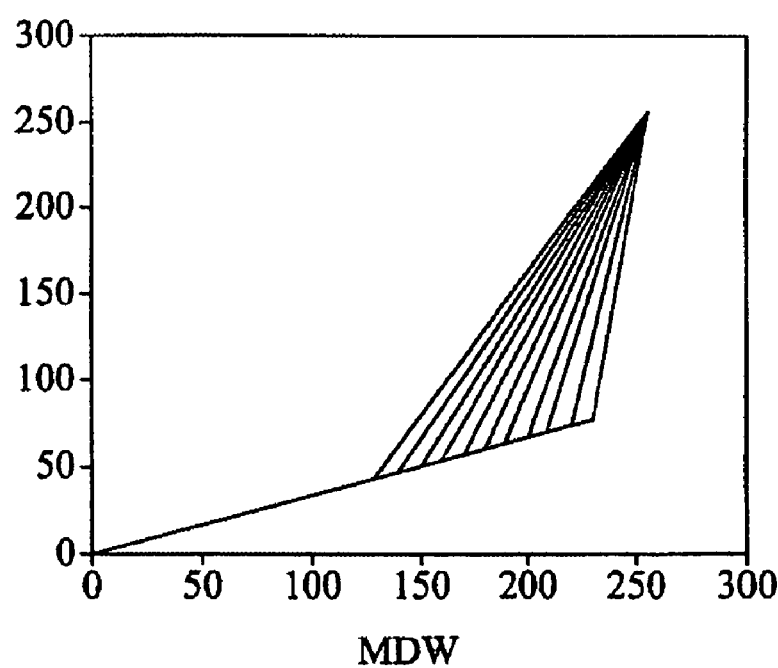
FIG. 16B illustrates a fixed slow allocated to diffuse image.

The prevent inventors considered optimization originally to include determining a range to be allocated to the specular highlights. However, it was determined that the scaling function could significantly change with different maximum diffuse white (MDW) resulting from the detection functionality. FIG. 16A shows two examples of scaling functions with variable MDW. FIG. 16A shows the scaling functions obtained by varying MDW while keeping the range allocated to the specular image (R) constant. FIG. 16B shows the scaling functions obtained by varying MDW while keeping the lower slope constant. It was determined that using an adaptive slope technique reduces the variability of the scaling functions.

Figure 17:
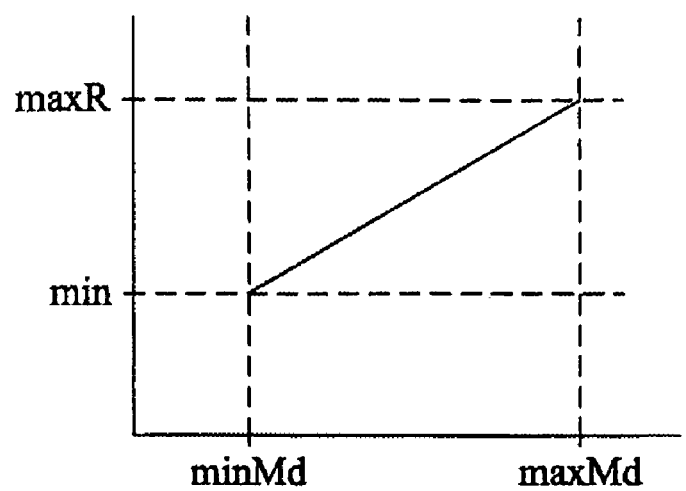
FIG. 17 illustrates adaptive slope parameters.

With the adaptive slope technique, the allocated range depends on the MDW value as illustrated in FIG. 17. The motivation is to have less variability with different mdw values:
1. the allocated range depends on mdw value.
2. the binary map is used for the scaling;
   a. The specular image is computed with the steepest part of the function;
   b. The diffuse image is scaled with the first slope (even if the diffuse white is brighter than the maximum diffuse white).
3. With the adaptive slope method, the allocated range depends on mdw value;

$$\text{slope}=(R_{max}-R_{min})/(Mdw_{max}-Mdw_{min});$$

$$R=\text{slope}\cdot Mdw-(Mdw_{min}\times \text{slope}-R_{min}).$$

The preferred embodiment values, as illustrated in FIG. 17, are $$R_{max}=170, R_{min}=64, Mdw_{max}=230, Mdw_{min}=130.$$

Figure 18:
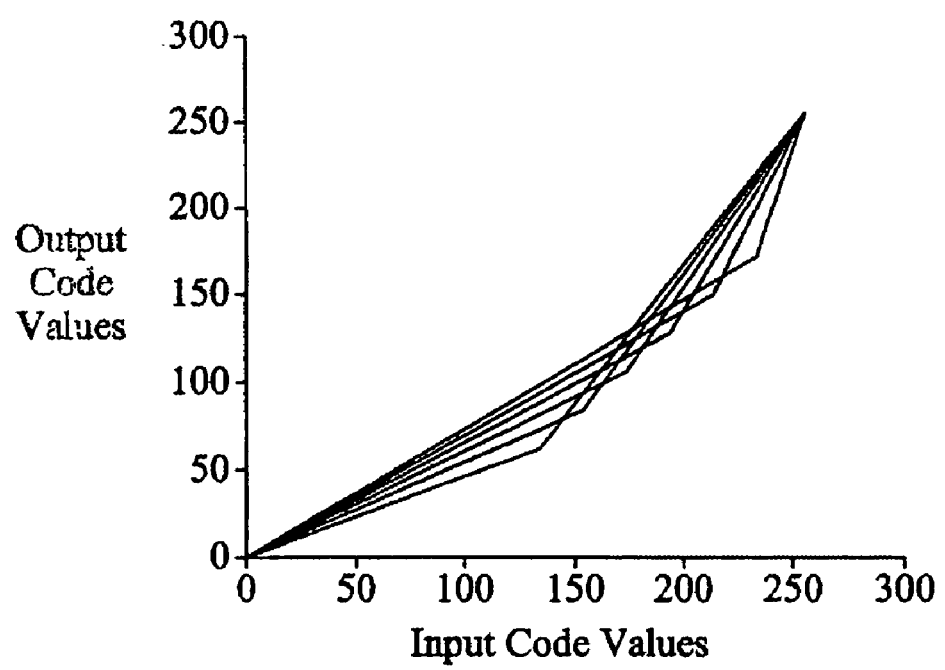
FIG. 18 illustrates an adaptive slope technique.

FIG. 18 illustrates an exemplary adaptive slope set of curves.

Figure 19:
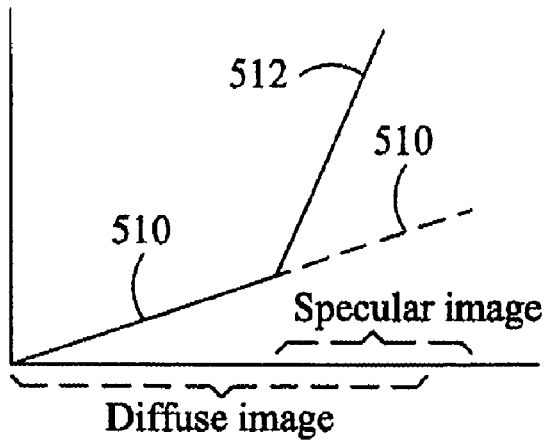
FIG. 19 illustrates tone scaling.

Since the maximum of the diffuse part is larger than the minimum of the specular image, the specular candidate binary map should be taken into account during the tone scaling operation. The scaling takes into account spatial information, as illustrated in FIG. 19 where the line 510 shows the scaling function that is applied on the diffuse image and the line 512 shows the scaling function that is applied to the specular image. This is the two TMO approach mentioned previously.

Figure 20:
FIG. 20 illustrates a linearly scaled image (left) and a piece wise linearly scaled image (right).

One technique to assess the quality of the processed images is to compare it with an image that was scaled using a simple linear method. FIG. 20 compares a linearly scaled image with an image scaled by piece-wise linear technique. Note how the specular highlights look brighter on the right image. Of course these two images should be compared on a high dynamic range display for most effectiveness.

Some alternatives and modifications include:
1. Selection of $D_{HDR}$, the luminance of the image diffuse maximum as displayed on the HDR display
2. The width of the transition region.
3. The size and shape of the low-pass filter F1, which can affect Diffuse$_{max}$.
4. The size and shape of the low-pass filter F2, which can affect Diffuse$_{max}$.
5. Use of a noise-removing low pass 3×3 filter is already applied.
6. Whether nonlinearities, such as gamma correction, are used on the two-tone mapping regions for diffuse and specular highlights.

Figure 21A:
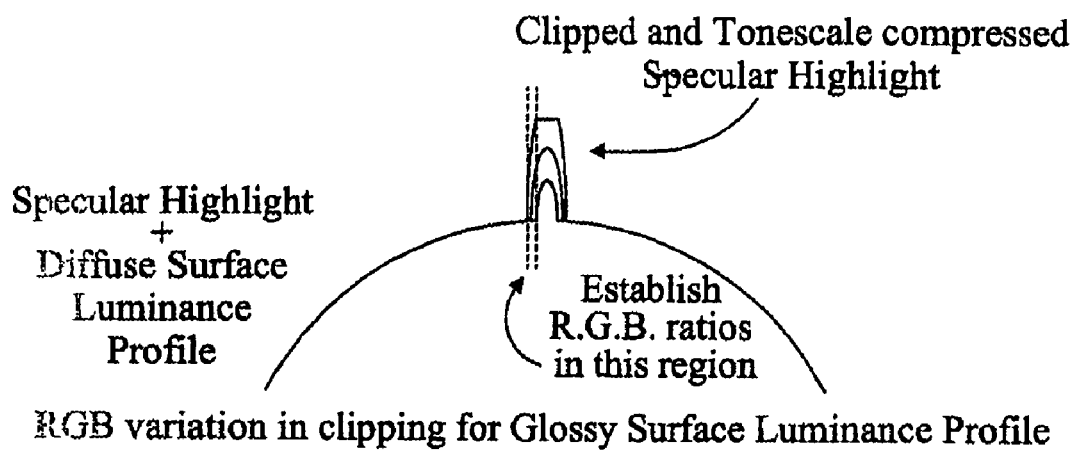
FIG. 21A illustrates mixed layer clipping of specular highlights.
Figure 21B:
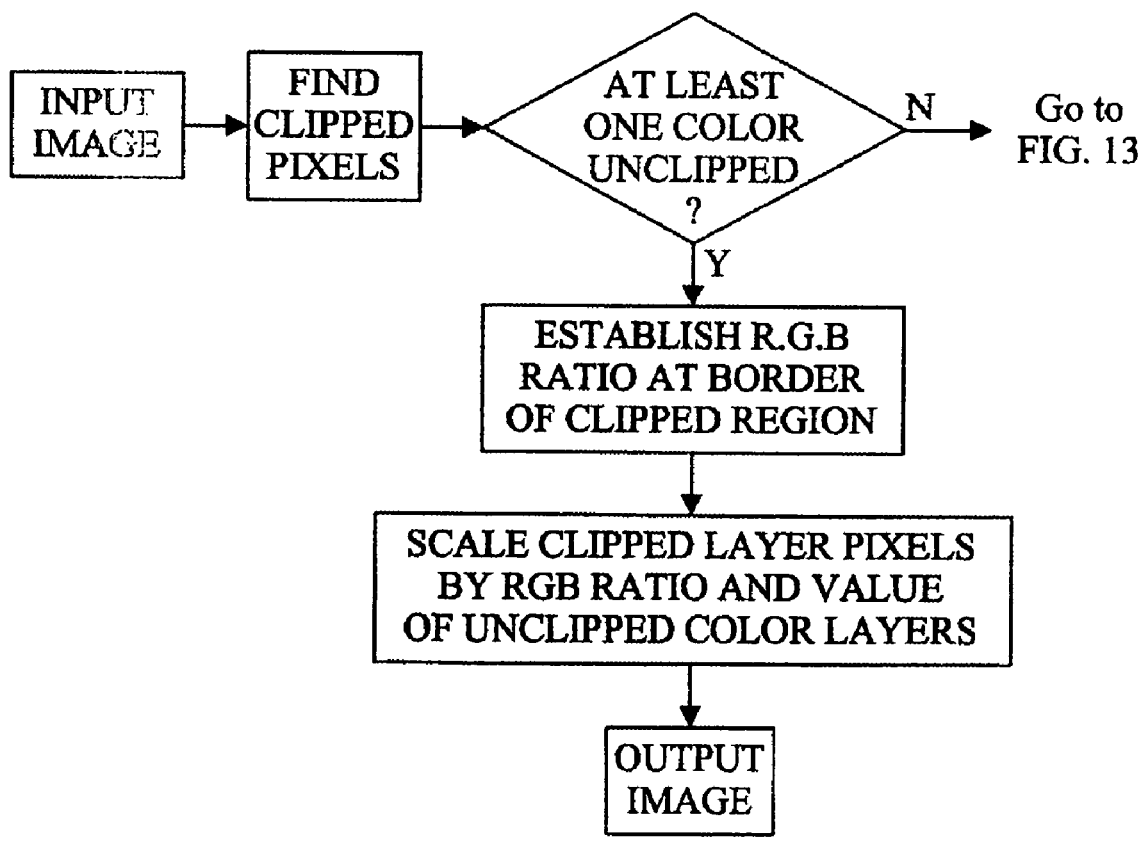
FIG. 21B illustrates a technique for using color ratios if one of the colors is not clipped.

Referring to FIGS. 21A and 21B, a method that uses the color ratio method to predict the clipped specular highlights is illustrated. The image profile of partially clipped specular highlights is shown in FIG. 21A and the technique for reconstruction of these is shown in FIG. 21B. Note that this technique can be used as a preprocessor for the principal technique (FIG. 13), for both outcomes.

Figure 22:
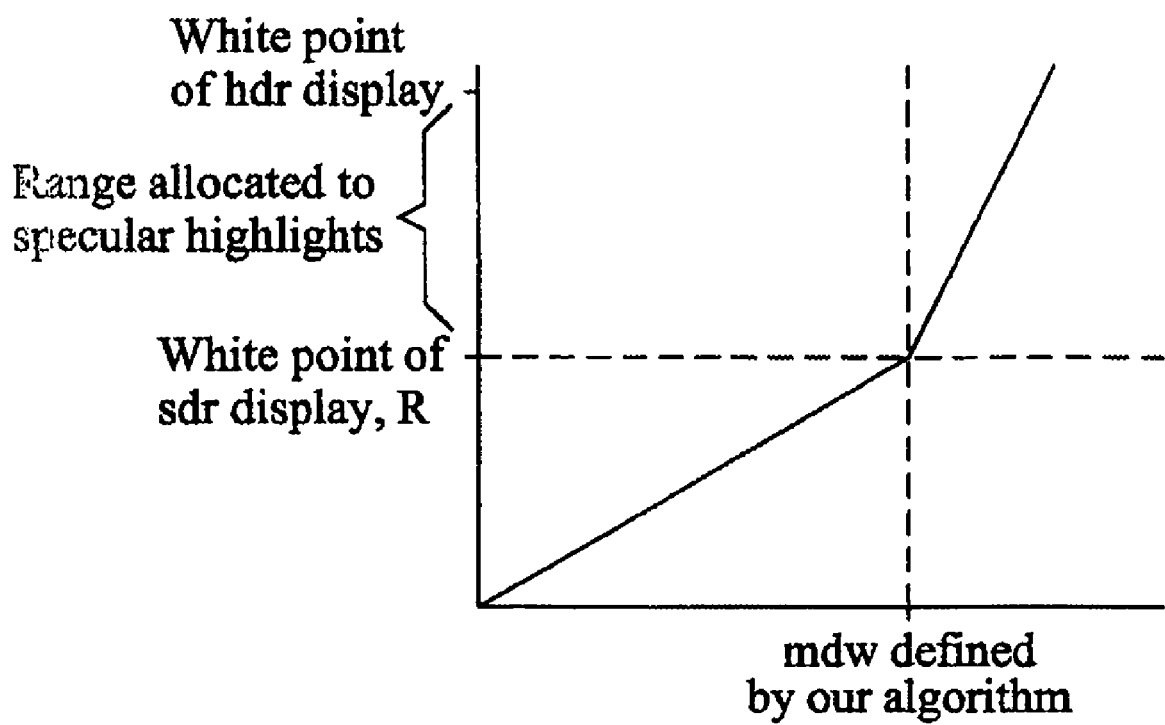
FIG. 22 illustrates range allocation using standard dynamic range white.

Another technique uses the HDR display so that its white point matches SDR displays (i.e., a given benchmark SDR display), and then the rest of the brightness capability of the HDR is allocated to the specular highlights. This approach works with "real" values instead of the ratio for the scaling. Instead of using the adaptive slope method to compute the range allocated to the specular highlight, the system could use the white point of standard LCDs display to define the range R. Then, all values brighter values brighter than R are specular highlights and will only be visible when displayed on the HDR monitor. This is illustrated in FIG. 22.

Another technique does not use the nonlinear TMO. This idea is based on the fact that if an image is scaled linearly from 8 to 16 bits, the contouring artifacts typically appear. In that case, the decontouring algorithm can be used to provide good HDR image from one LDR image. However, due to the properties of some HDR monitors such as (low-resolution of the led layer), no contour artifacts appear even after a linear scaling. Plus, this technique does not generate more realistic specular highlights, but it does extend the dynamic range and provides a linear scaling free of contours artifacts. The technique may adapt the coring function to 16 bits images and compare linearly scaled images against linearly scaled images after decontouring.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

We claim:

1. A method for displaying a color image comprising:
    (a) receiving an image having a first dynamic range;
    (b) modifying said image with a computing device to a second dynamic range, wherein said second dynamic range is greater than said first dynamic range; wherein said modification includes the steps of:
        (i) converting a received said image which is in a substantially gamma domain to a substantially linear luminance domain;
        (ii) processing at least two color channels of said image, in said substantially linear luminance domain to assign a first luminance value as a maximum diffuse luminance of said image;
        (iii) said modifying is based upon a scaling operation that scales luminance values using a pair of linear functions each linear in a luminance domain of said image and joined together at a second luminance value of said substantially linear luminance domain in the respectively processed said at least two color channels, where said second luminance value is less than said first luminance value by an amount calculated as a function of said first luminance value; and
    (c) displaying said modified image on a display.

2. The method of claim 1 wherein the lower range of said first dynamic range is mapped to the lower range of said second dynamic range with a first function, wherein the higher range of said first dynamic range is mapped to the higher range of said second dynamic range with a second function, wherein said first function has a denser mapping than said second function.

3. The method of claim 2 wherein said first dynamic range is a first luminance dynamic range, and said second dynamic range is a second luminance dynamic range.

4. The method of claim 1 wherein said at least two color channels are compared to one another.

5. The method of claim 4 wherein said comparing occurs proximate a region of clipped highlights.

6. The method of claim 1 wherein said modifying is based upon said function without discontinuities.

7. The method of claim 1 wherein said first dynamic range is a first luminance dynamic range, and said second dynamic range is a second luminance dynamic range.

8. The method of claim 6 wherein said first dynamic range is a first luminance dynamic range, and said second dynamic range is a second luminance dynamic range.

9. A method for displaying an image having specular highlights, said method comprising:
    (a) receiving an image having a first dynamic range;
    (b) modifying said image with a processing device to a second dynamic range using a transformation that allocates a specular portion of said second dynamic range to display said specular highlights and a diffuse portion of said second dynamic range to display diffuse tones of said image, wherein said second dynamic range is greater than said first dynamic range, and wherein said specular portion of said second dynamic range has a size calculated as a function of a maximum diffuse luminance value received from said image;
    (c) displaying said modified image a display.

10. The method of claim 9 wherein said transformation uses a plurality of piecewise functions where the slope of at least one said piecewise function is adaptively determined.

* * * * *